2,754,339

DEHYDROGENATION OF AROMATIC BICYCLIC COMPOUNDS

Herman Pines, Evanston, Ill., assignor to Universal Oil Products Company, Chicago, Ill., a corporation of Delaware No Drawing. Application December 28, 1953, Serial No. 400,783

16 Claims. (Cl. 260—668)

This invention relates to a process for dehydrogenating non-aromatic bicyclic compounds, or, more particularly, to a process for dehydrogenating bicyclic terpenes in the presence of alkali metals and organic promoters capable of forming organometallic compounds.

An object of this invention is to dehydrogenate non-aromatic bicyclic compounds to form aromatic compounds.

A further object of this invention is to dehydrogenate bicyclic terpenes in the presence of alkali metals and hydrides thereof to form aromatic compounds.

A specific object of this invention is to dehydrogenate bicyclic terpenes in the presence of alkali metals and their hydrides thereof and an organic compound capable of forming an organometallic compound to form aromatic compounds.

One embodiment of this invention resides in a process which comprises contacting a non-aromatic unsaturated bicyclic compound with a catalyst consisting of alkali metals and their hydrides thereof and an organic promoter capable of forming an organometallic compound.

A further embodiment of this invention is found in a process for dehydrogenating a non-aromatic unsaturated bicyclic compound containing a 6-membered carbon atom ring and a 3 or 4-membered carbon atom ring by contacting said compound with a catalyst consisting of alkali metals and their hydrides thereof and an organic promoter capable of forming an organometallic compound.

A specific embodiment of this invention resides in a process for dehydrogenating a bicyclic terpene containing a 6-membered carbon atom ring and a 3 or 4-membered carbon atom ring by contacting said terpene with a catalyst consisting of alkali metals and their hydrides thereof and a polynuclear aromatic hydrocarbon, to form aromatic compounds.

Another specific embodiment of this invention resides in a process for dehydrogenating a non-aromatic bicyclic hydrocarbon containing a 6-membered carbon atom ring and a 3 or 4-membered carbon atom ring by contacting said bicyclic hydrocarbon with a catalyst consisting of alkali metals and their hydrides thereof and a halogenated aromatic compound, whereby aromatic compounds are formed therefrom.

A more specific embodiment of this invention resides in a process for dehydrogenating a bicyclic terpene containing a 6-membered carbon atom ring and a 3 or 4-membered carbon atom ring by contacting said bicyclic terpene with a catalyst consisting of alkali metals and their hydrides thereof and an organic promoter capable of forming an organometallic compound at a temperature in the range of from about 100° C. to about 400° C. or more, and at a pressure in the range of from about atmospheric to about 200 atmospheres, to form aromatic hydrocarbons.

A still more specific embodiment of this invention is found in a process for dehydrogenating α-pinene by contacting said pinene with a catalyst consisting of sodium and o-chlorotoluene at a temperature in the range of from about 160° C. to about 300° C. and at a pressure in the range of from about atmospheric to about 25 atmospheres to form p-cymene and 1,2,3-trimethylbenzene.

Other objects and embodiments of this invention referring to alternative non-aromatic unsaturated bicyclic compounds and to alternative catalysts will be found in the following further detailed description of this invention.

It has now been discovered that when a non-aromatic bicyclic compound such as bicyclic terpene is reacted with an alkali metal and an organic compound capable of forming an organometallic compound, a ring rupture and a dehydrogenation of the terpene occurs. This ring rupture and dehydrogenation converts the bicyclic terpenes to aromatic hydrocarbons having alkyl substituents in the ring.

Unsaturated bicyclic terpenes containing a 6-membered carbon atom ring and 3 or 4-membered carbon atom ring such as α-pinene, β-pinene, α-carene, β-carene, α-thujene, β-thujene, sabinenes, δ-dihydrocaryophyllene, etc. may undergo this rupture and dehydrogenation. For example, when α-pinene is subjected to this dehydrogenation reaction the resulting aromatic hydrocarbons will consist mainly of p-cymene and a smaller amount of 1,2,3-trimethylbenzene. These alkyl substituted aromatic compounds may be useful in the preparation of pharmaceuticals, resins, plastics, and as intermediates for the preparation of other organic compounds.

The dehydrogenation and rupture of the ring is carried out in the presence of catalysts including alkali metals and alkaline earth metals or their hydrides. For purposes of this invention, the term "alkali metal" when pertaining to a catalyst, embraces both alkali metals and alkaline earth metals such as sodium, potassium, magnesium, lithium, strontium, rubidium, cesium, barium, or calcium. The hydrides of these metals include calcium hydride, barium hydride, strontium hydride, lithium hydride, sodium hydride, potassium hydride, magnesium hydride, etc. and mixtures thereof such as calcium-lithium hydride, calcium-barium hydride, lithium-potassium hydride, sodium-lithium hydride, etc. Other metallic hydrides which may be used for catalysts in this reaction, although not falling within the class of alkali metals, include aluminum hydride or combinations of aluminum hydride with any of the aforesaid alkali or alkaline earth metals including lithium-aluminum hydride, calcium-aluminum hydride, sodium-aluminum hydride, etc. Metalloid hydrides such as boron hydride may also be used within the scope of this invention, although not neccessarily with equivalent results. Combinations of catalysts containing dehydrogenating properties may also be used. Such combinations include the combinations of nickel and sodium, molybdenum oxide and sodium, chromium oxide and sodium, nickel and sodium hydride, nickel and potassium hydrides, molybdenum oxide and potassium hydrides, etc.

The reaction of the present invention is promoted by the addition of small amounts of compounds which are capable of forming an organometallic compound with the metallic catalyst during the reaction. These organic promoters which combine with a metal to form the aforesaid organometallic compounds including polynuclear aromatic hydrocarbons such as anthracene, dihydroanthracene, fluorene, phenanthracene, tetralin, and the like; heterocyclic compounds containing rings consisting of a nitrogen atom and at least 4 but not more than 5 carbon atoms such as pyridine, picoline, and other alkyl pyridines, quinoline, isoquinoline and various alkylated quinolines and isoquinolines, piperidine, pyrrole, etc.; organic peroxide compounds such as acetyl peroxide, benzoyl peroxide, di-t-butyl peroxide, t-butyl hydroperoxide, tetralin hydroperoxide, methyl cyclopentyl hydroperoxide, dimethyl cyclopentyl hydroperoxide, etc.; acetylenic compounds such as acetylene, methylacetylene, ethylacetylene, pentyne, hexyne, heptyne, etc.; halogenated aromatic compounds such as o-chlorotoluene, o-bromotoluene, o-chloroethylbenzene, o-chloropropylbenzene, o-bromoethylbenzene, etc. In addition, the catalysts may include combinations of alkali metal or several alkali metals and at least one organometallic compound. The organometallic compounds which are useful in this process are reactive metal compounds in which a valence bond of the metal is combined directly with a cabon atom of the hydrocarbon radical. Organometallic compounds such as these include lead tetraalkyls, lead tetraaryls, lead alkylaryls, zinc aryls, mercury dialkyls and diaryls, tin tetraalkyl and the like. Alkyl metal halides such as alkyl lead chloride, aryl metal halides such as phenyl mercury chloride and the like may be used. In the present invention, sodium and potassium are generally preferred due to the relatively lower cost and availability of these metals. The amount of alkali metal and the organic promoter used are dependent upon the particular unsaturated bicyclic terpenes being reacted. In general, an excess of alkali metals over the organic compound capable of forming an organometallic compound is employed, thus insuring the presence of free metal as well as an organometallic salt. Better contacting of the reactants and the catalysts for improved yields of the desired products are sometimes effected by use of a catalyst support or supporting material such as activated charcoal, granular coke, silica, alumina, pumice, porcelain, quartz, steel turnings, copper shot, etc., which do not have an advantageous influence on the reaction but improve the mixing. Such spacing materials are used in either batch type operations as an autoclave, or in continuous treatment as in a tubular reactor or other suitable apparatus.

The process of this invention may be effected in any suitable manner which may be carried out by using either a batch or continuous type of operation and suitable equipment such as autoclave or tubular reactors constructed from steel or glass lined steel reactors. The process is carried out at temperatures in the range of from about 100° C. to about 400° C. or more, and preferably at temperatures ranging from about 150° C. to about 275° C. Atmospheric or superatmospheric pressures are used in this process ranging from about atmospheric to about 200 atmospheres, the preferred range being from about 5 atmospheres to about 25 atmospheres. An inert gas such as nitrogen may be used to charge the reactors, although not necessarily required. When a batch type operation is used, a quantity of the bicyclic terpenes and the catalyst comprising the alkali metal or hydrides thereof and the organic promoter, is placed in a reaction vessel equipped with a mixing device. The amount of catalyst used in the process is dependent upon the nature and reactivity of the bicyclic hydrocarbons. Also, the particular catalyst promoter used in the reaction has an influence upon the amount of alkali metal necessary to affect operation of the process. In general, from about 0.05 to about 0.5 atomic proportion of alkali metal is present per molecular proportion of bicyclic terpene present in the reaction zone. After the reaction has reached the desired stage of completion, the reaction products are discharged from the autoclave, the unconverted bicyclic terpenes being recovered for further use in the process or utilized for some other purpose. The mixture of reaction products is then subjected to suitable separation treatment such as filtration to recover unconsumed catalyst, followed by a fractional distillation of the normally reacted products to separate said unconverted charge stock from the dehydrogenated bicyclic terpene.

Another method of operation of the present process is of a continuous type. A particularly suitable type of operation comprises a fixed bed type of which the catalyst is disposed as a bed in the reaction zone while the unsaturated bicyclic terpenes containing a 6-membered carbon atom ring and a 3 or 4-membered carton atom ring is passed therethrough in either upward or downward flow. The bicyclic terpene may be heated while in the reaction zone or may be heated prior to admixture into said zone and kept at the desired temperature while therein. The reaction products are continuously discharged from the reaction zone and subjected to an operation substantially the same as that hereinbefore described with reference to the batch type of operation. Another continuous type process is the fluidized type of operation in which the unsaturated bicyclic terpene and the catalyst are maintained in a state of turbulence under hindered settling conditions in the reaction zone. Still other types of continuous processes include the compact moving bed type of operation in which the catalyst and the bicyclic terpene pass either concurrently or countercurrently to each other, and the slurry type process in which the catalyst is carried into the reaction zone as a slurry in the unsaturated bicyclic terpene. The unreacted bicyclic terpene may be separated out and recycled for use as a portion of the charge stock while the desired product is withdrawn and purified.

The following examples are given to illustrate the process of the invention which, however, are not intended to limit the generally broad scope of the present invention in strict accordance therewith.

*Example 1*

α-Pinene, 68 g., was heated in a glass lined 850 cc. capacity rotating autoclave along with 4 g. of sodium and 1.0 g. of o-chlorotoluene. The autoclave was charged with 15 atmospheres of nitrogen, heated to a temperature ranging from about 215° C. to about 265° C. and maintained thereat for a period of approximately 2 hours. The nitrogen was added in order to keep the reactants within the glass liner and to prevent the diffusion of the liquid hydrocarbons during the reaction from the liner through the glass capillary into the autoclave.

The reaction products contained finely divided sodium or organosodium compounds in suspension in the liquid. Thereafter the contents of the liner were diluted and the upper layer decanted and decomposed with ethyl alcohol. The upper layer was subjected to fractional distillation and a cut of about 40 g. distilling at a temperature in the range of from about 153° C. to 171° C., having a refractory index of $n_D^{20}=1.4460$–$1.4800$ was separated out. The remainder consisted of 7.0 g. of higher boiling compounds.

The lower layer was also subjected to fractional distillation and a cut containing 7.7 g. of products boiling at 145° C. to 174° C. was separated.

The hydrocarbons from the upper and lower layer having a boiling point of from 145° to 174° C. were selectively hydrogenated in the presence of a nickel-kieselguhr catalyst at 35° C. to 40° C. and a pressure of 100 atmospheres of hydrogen. From the pressure drop it was calculated that one mole of hydrogen was adsorbed per mole of hydrocarbon charged to the reactor. The aromatic hydrocarbons resulting from this dehydrogenation were chromatographically separated by means of silica gel. Approximately 42% of the liquid product therefrom consisted of aromatic hydrocarbons, according to infra-red spectral analysis, comprising over 95% p-cymene and the remainder 1,2,3-trimethylbenzene.

*Example II*

Approximately 65 g. of β-pinene along with 4 g. of sodium and 1 g. of acetylene are placed in a 850 cc. glass lined rotating autoclave, charged at 15 atmospheres of nitrogen and heated to approximately 250° C. for a period of 2 hours. The reaction products are diluted and the upper and lower layers thereof separated. Both layers are subjected to fractional distillation and the products boiling in the range of from approximately 145° C. to approximately 175° C. are separated and selectively hydrogenated in the presence of a nickel-kieselguhr catalyst under approximately 100 atmospheres of hydrogen. The aromatic hydrocarbons formed by this process are chromatographically separated and subjected to infra-red spectral analysis to show the products consist of p-cymene and trimethylbenzene.

I claim as my invention:

1. A process for dehydrogenating an unsaturated bicyclic terpene containing a 6-membered carbon atom ring and a ring selected from the group consisting of 3 and 4-membered carbon atom rings which comprises contacting said bicyclic terpene with a catalyst selected from the group consisting of alkali metals and their hydrides in the presence of a polynuclear aromatic hydrocarbon to form aromatic compounds.

2. A process for dehydrogenating unsaturated bicyclic terpenes containing a 6-membered carbon atom ring and a ring selected from the group consisting of 3 and 4-membered carbon atom rings which comprises contacting said bicyclic terpene with a catalyst selected from the group consisting of alkali metals and their hydrides at a temperature in the range of from about 100° C. to about 400° C. or more, in the presence of an organic promoter compound capable of forming an organometallic compound with said catalyst.

3. A process for dehydrogenating an unsaturated bicyclic terpene containing a 6-membered carbon atom ring and a ring selected from the group consisting of 3 and 4-membered carbon atom rings which comprises contacting said bicyclic terpene with a catalyst selected from the group consisting of alkali metals and their hydrides at a temperature in the range of about 150° to 275° C. or more, in the presence of an organic promoter compound capable of forming an organometallic compound with said catalyst.

4. A process for dehydrogenating an unsaturated bicyclic terpene containing a 6-membered carbon atom ring and a ring selected from the group consisting of 3 and 4-membered carbon atom rings which comprises contacting said bicyclic terpene with a catalyst selected from the group consisting of alkali metals and their hydrides at a temperature in the range of about 150° to about 275° C. or more and at a pressure in the range of from about atmospheric to about 200 atmospheres, in the presence of an organic promoter compound capable of forming an organometallic compound with said catalyst.

5. A process for dehydrogenating a bicyclic terpene containing a 6-membered carbon atom ring and a ring selected from the group consisting of 3 and 4-membered carbon atom rings which comprises contacting said bicyclic terpene with a catalyst selected from the group consisting of alkali metals and their hydrides at a temperature in the range of about 150° to about 275° C. or more and at a pressure in the range of from about atmospheric to about 25 atmospheres, in the presence of an organic promoter compound capable of forming an organometallic compound with said catalyst.

6. A process for dehydrogenating a bicyclic terpene containing a 6-membered carbon atom ring and a ring selected from the group consisting of 3 and 4-membered carbon atom rings which comprises contacting said bicyclic terpene with a catalyst selected from the group consisting of alkali metals and their hydrides at a temperature in the range of from about 150° C. to about 275° C. and at a pressure in the range of from about atmospheric to about 25 atmospheres of an inert gas in the presence of an organic promoter compound capable of forming an organometallic compound with said catalyst.

7. A process for dehydrogenating α-pinene which comprises contacting said pinene with a catalyst selected from the group consisting of alkali metals and their hydrides at a temperature in the range of from about 150° to 275° C., and at a pressure in the range of from about atmospheric to 25 atmospheres of nitrogen, in the presence of an organic promoter compound capable of forming an organometallic compound with said catalyst.

8. A process for dehydrogenating α-pinene which comprises contacting said pinene with a catalyst consisting of sodium and o-chlorotoluene, at a temperature in the range of from about 150° C. to about 275° C. and at a pressure in the range of from about atmospheric to about 25 atmospheres of nitrogen, to form p-cymene and 1,2,3-trimethylbenzene.

9. A process for dehydrogenating an unsaturated bicyclic terpene containing a 6-membered carbon atom ring and a ring having at least 3 but not more than 4 carbon atoms, which comprises contacting said terpene with a catalyst selected from the group consisting of alkali metals and their hydrides in the presence of an organic promoter compound capable of forming an organometallic compound with said catalyst.

10. The process of claim 9 further characterized in that said promoter compound is a heterocyclic compound having a ring consisting of a nitrogen atom and at least 4 but not more than 5 carbon atoms.

11. The process of claim 9 further characterized in that said promoter compound is an organic peroxide.

12. The process of claim 9 further characterized in that said promoter compound is an acetylenic hydrocarbon.

13. The process of claim 9 further characterized in that said promoter compound is a halogenated aromatic hydrocarbon.

14. The process of claim 9 further characterized in that said terpene is pinene.

15. The process of claim 9 further characterized in that said terpene is pinene and said promoter compound is o-chlorotoluene.

16. A dehydrogenation process which comprises contacting pinene with an alkali metal catalyst in the presence of o-chlorotoluene at a temperature of from about 100° C. to about 400° C.

References Cited in the file of this patent

UNITED STATES PATENTS 1,968,208    Hugel et al. _____ July 31, 1934

OTHER REFERENCES

Linstead et al.: Journal of the Chemical Society of London, December 1940, pages 1139–1147.